United States Patent
Werner et al.

(10) Patent No.: US 10,044,404 B2
(45) Date of Patent: Aug. 7, 2018

(54) SYNCHRONIZED ACCESS POINT TRANSMISSIONS WITH RANDOM TIMING

(71) Applicant: Ingenu, San Diego, CA (US)

(72) Inventors: Daniel Werner, San Diego, CA (US); Theodore Myers, San Diego, CA (US)

(73) Assignee: Ingenu, San Diego, CA (US)

( * ) Notice: Subject to any disclaimer, the term of this patent is extended or adjusted under 35 U.S.C. 154(b) by 0 days.

(21) Appl. No.: 15/370,469

(22) Filed: Dec. 6, 2016

(65) Prior Publication Data
US 2018/0159587 A1    Jun. 7, 2018

(51) Int. Cl.
*H04B 1/7103*   (2011.01)
*H04B 1/7073*   (2011.01)

(52) U.S. Cl.
CPC ......... *H04B 1/7103* (2013.01); *H04B 1/7073* (2013.01)

(58) Field of Classification Search
CPC ........ H04B 1/69; H04B 1/707; H04B 1/7073; H04B 1/709; H04B 1/7103; H04B 1/7115; H04B 1/71635; H04B 1/71637; H04B 2001/71563; H04B 2001/71566
USPC .......... 375/141–150, 152; 370/335, 342, 350
See application file for complete search history.

(56) References Cited

U.S. PATENT DOCUMENTS

| | | | | |
|---|---|---|---|---|
| 5,365,281 A * | 11/1994 | Ko | ........................ | H04N 5/144 348/669 |
| 6,985,510 B2 * | 1/2006 | Willenegger | .......... | H04B 1/707 370/522 |
| 2003/0147358 A1 * | 8/2003 | Hiramatsu | ............. | H04B 1/692 370/281 |
| 2004/0136344 A1 * | 7/2004 | Kim | ..................... | H04B 7/2628 370/335 |
| 2012/0219037 A1 * | 8/2012 | Myers | .................. | H04B 1/7103 375/141 |

OTHER PUBLICATIONS

International Search Report and Written Opinion issued on PCT/US2017/064741, dated Jan. 8, 2018.

* cited by examiner

*Primary Examiner* — Young T Tse

(57) ABSTRACT

Methods, systems, and apparatuses, including computer programs encoded on computer-readable media, are configured to spread a first frame of data using a first spreading code to create a spread first frame and to spread a second frame of data using the first spreading code to create a spread second frame. A delay generator generates a first transmission delay and a second transmission delay. A transmitter starts to transmit the first spread frame on a first frame boundary delayed by the first transmission delay and starts to transmit the second spread frame on a second frame boundary delayed by the second transmission delay. A receiver starts to receive a third spread frame on a third frame boundary delayed by the first transmission delay and starts to receive a fourth spread frame on a fourth frame boundary delayed by the second transmission delay.

19 Claims, 3 Drawing Sheets

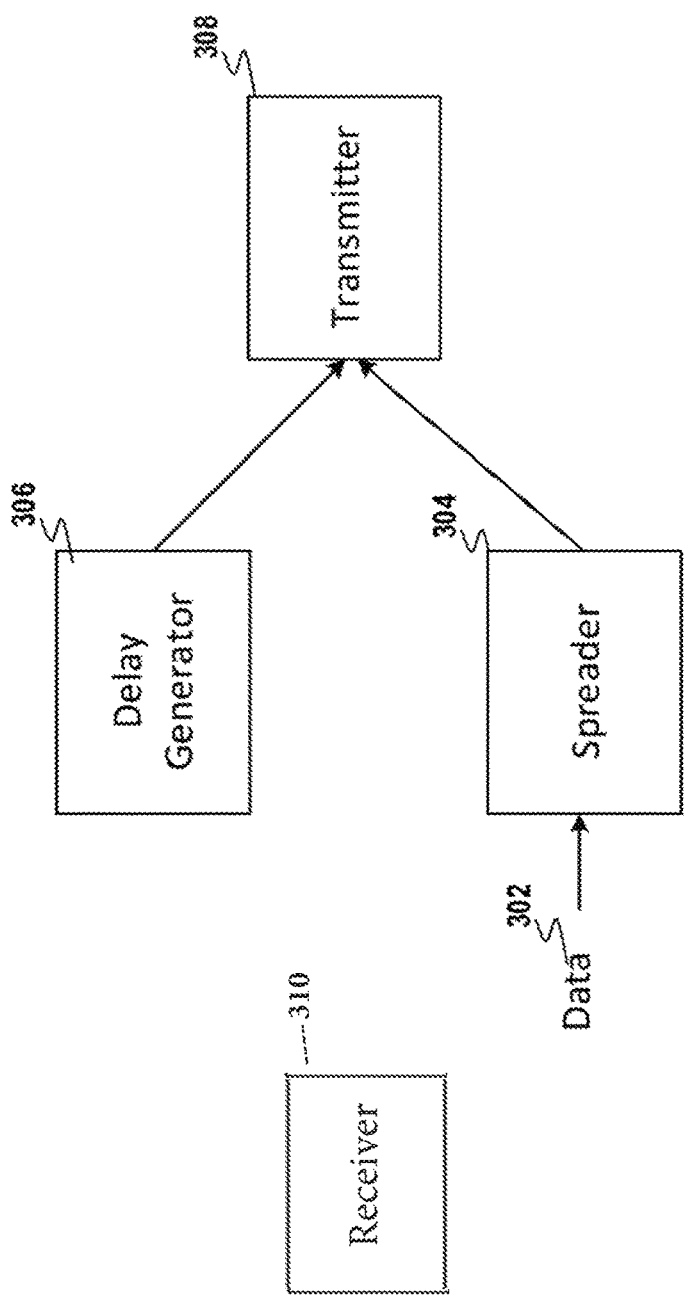

SYNCHRONIZED ACCESS POINT TRANSMISSIONS WITH RANDOM TIMING

BACKGROUND

A typical wireless communication network uses multiple access points to provide network coverage to modules. To provide coverage over an area, signals from access points can overlap. These overlapping signals can interfere with one another. Some approaches to minimize or eliminate the interference include access points using different spreading codes, different frequencies, etc. When access points are synchronized, however, reducing interference becomes more difficult.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 3 is a system diagram of an access point in accordance with one implementation.

Figure 1:
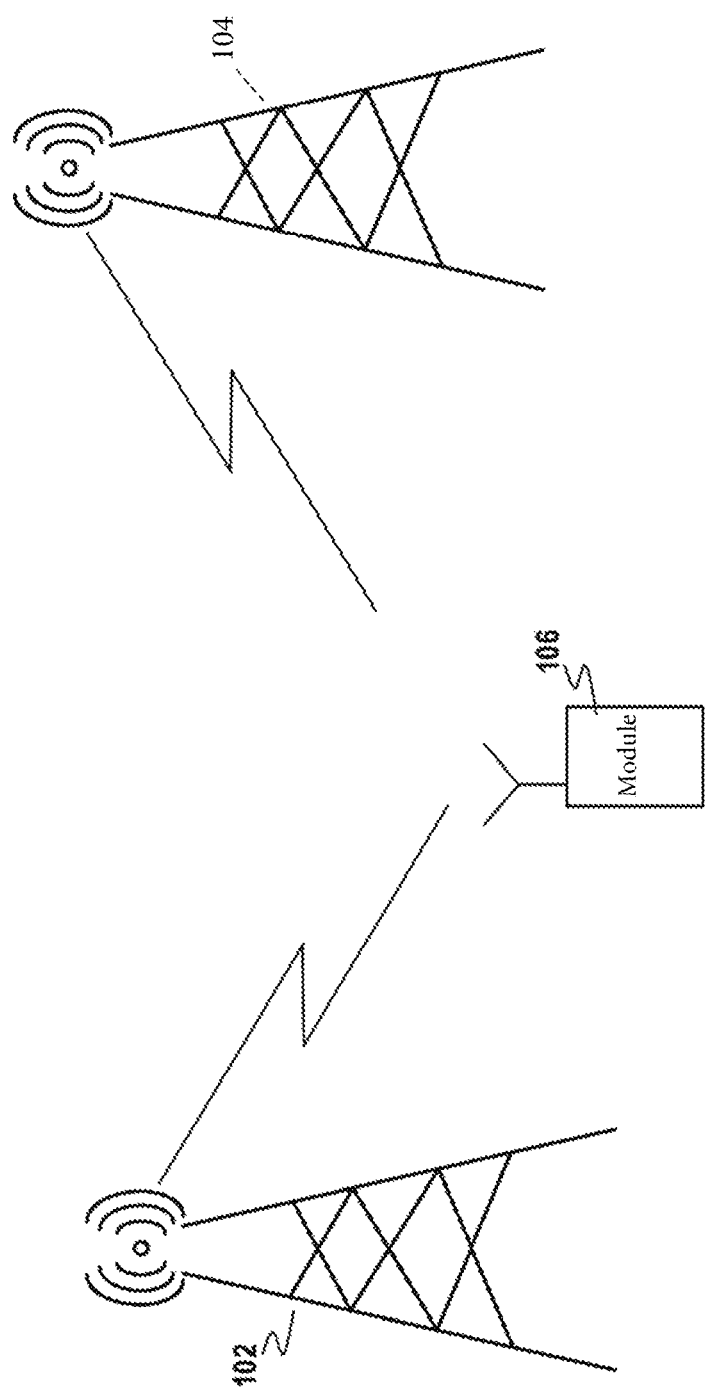
FIG. 1 illustrates a system including a module receiving signals from two different access points in accordance with one implementation.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Described below are systems that reduce access point interference when the access points transmit data in a synchronized fashion. In various implementations, one access point is sending the desired signal to the receiver in the presence of different data transmitted from different access points using different spreading codes that is undesired as it is destined for different endpoints. As the signals are synchronized, some receivers may be consistently receiving the undesired signal at a cross-correlation peak. For these receivers, the other signal has a much more detrimental effect on demodulation because the undesired signal as the undesired signal has a gain applied based on this cross-correlation peak. This also impacts the ability of the receiver to accurately estimate the power of the desired signal in regards to facilitating power control. To reduce the possibility of the undesired signal arriving at a cross-correlation peak, each access point can introduce a random amount of time to delay its transmission. Thus, the signals become separated by a time component.

Even with a random delay component, signals can still be received at a cross-correlation peak. For example, a module could be located in a position such that two signals from two access points arrive at the module at a cross correlation peak. Interference between these signals, therefore, would become significantly worse since now the undesired signal is subject to the gain associated with the cross-correlation peak. This interference can be a major issue if the module is stationary, such that the signal from a different access point always interferes significantly more adversely with the real signal from another access point. In various implementations, to eliminate the issue of the signals always interfering more adversely with one another the random delay added by each access point is changed for each frame transmitted by the access points. The stationary module, therefore, will almost always receive the two signals without the undesired signal gained by the cross-correlation peak. The signals can still adversely interfere if the selected random times are such that the two signals arrive at a cross-correlation peak. Even if this occurs, the next frame will use different offsets at both access points, such that the signals carrying the next frame are highly unlikely to arrive at the module at a cross-correlation peak.

FIG. 1 illustrates a system including a module 106 receiving signals from two different access points 102 and 104 in accordance with one implementation. In various implementations, the access points 102 communicates a desired signal to a module 106 in the presense and 104 communicating to a set of modules that does not include 106. Data transmitted on the broadcast channel can be spread using the same spreading code. Accordingly, the broadcast signal from the access points 102 and 104 can interfere with one another. Each access point can introduce a time delay before each broadcast is transmitted. Thus, broadcast frames will usually be received by the module 106 at a relative timing different from a cross-correlation peak. It is possible that the signal will be received at a cross-correlation peak. Adding a random delay at the start of each frame transmission, however, allows the signals from 102 and 104 to be received at a relative timing not comprising a cross-correlation peak a large percentage of time. A stationary module, therefore, will not experience a constant adverse interference that could occur without the random transmission delay.

Figure 2:
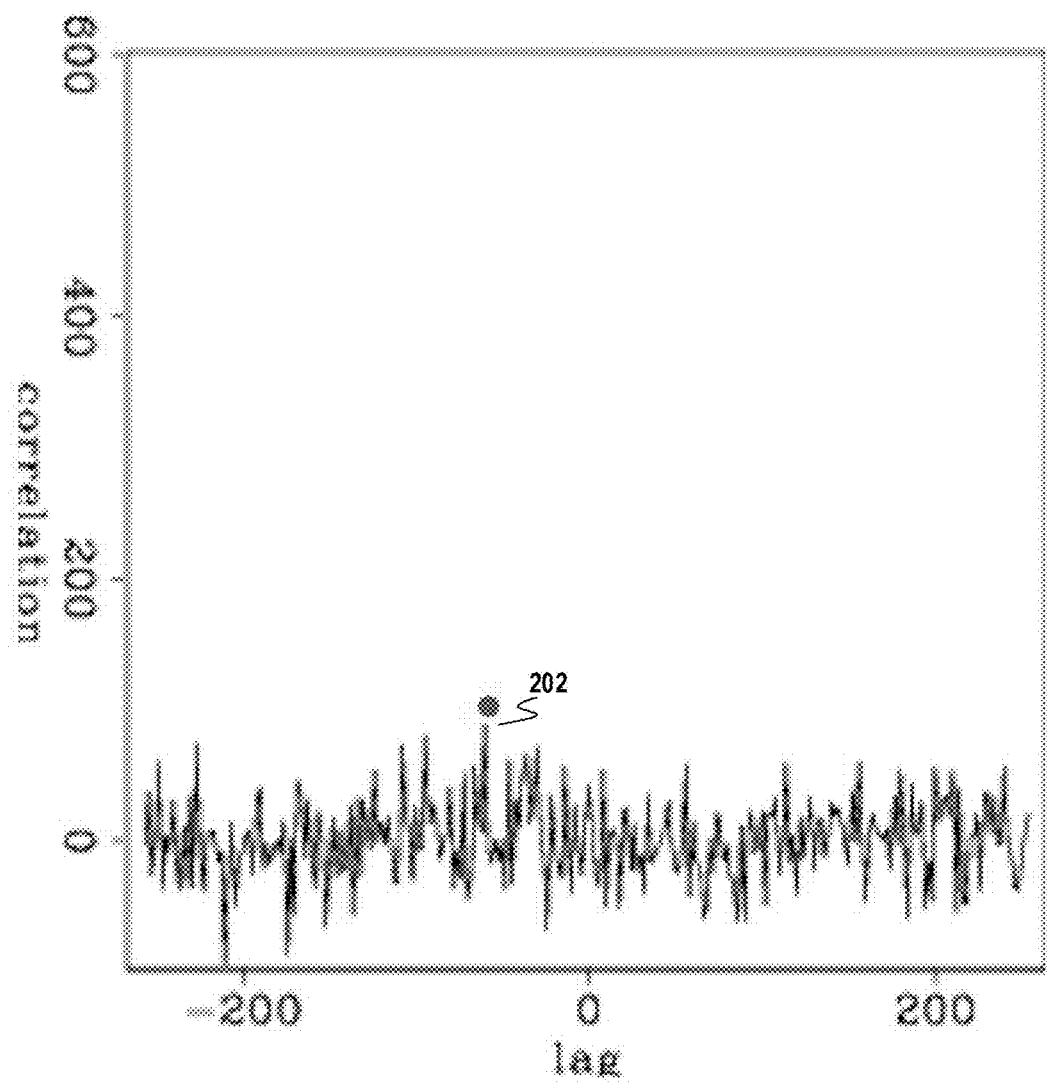
FIG. 2 is a graph of a cross correlation function of two different PN codes in accordance with one implementation.

FIG. 2 is a graph of a cross correlation function of two different PN codes in accordance with one implementation. A peak 202 of interference is shown. The timing offset of the peak 202 would create significant interference for another signal spread with a different gold code. If the correct signal has this timing offset, the peak 202 can cause enough interference for the correct signal to be lost. For example, a broadcast signal from a first access point can be interfered by a broadcast signal from another access point at the shown timing offset. A module could be prevented from decoding the proper broadcast signal due to the peak 202 of interference.

One example of where a signal can interfere with a proper signal is when the proper signal is received at a cross-correlation peak. This can occur when the module is stationary. Interference can occur when the module is moving as well. When a module is stationary, if the signal from a second access point is received at the cross-correlation peak, it is possible that the second signal will be received at the cross-correlation peak a large percentage of the time. Introducing a random timing offset from the frame boundary at both access points, ensures that the two signals will not be received at the cross-correlation peak the majority of the time. For example, using a random timing offset, the peak 202 would not always occur at the same timing offset. This then would ensure that the interference from the peak 202 would not continuously interfere with a proper signal. Introducing a random delay from 0 to n chips will not eliminate the cross-correlation peak noise, but will statistically reduce the interference such that the module will be able to receive broadcast data from the first access point without interference from the second access point.

In various implementations, the broadcast channel is synced between access points, such that frame boundaries, timing, etc. are the same across all access points. Broadcast data can be spread using spreading codes of various lengths. Since the access points are in sync, the likelihood of interference is greater than if the access points were not in sync with one another. Broadcast data spread with shorter codes will interfere with one another more compared to data spread with longer codes. In one implementation the spreading code used is 256 bits long. In other implementations, the spreading code can be up 2,048 bits long.

FIG. 3 is a system diagram of an access point in accordance with one implementation. The access point has data 302 that is to be transmitted. For example, the data 302 can be broadcast data. The data 302 can also be organized in a particular structure, such as in a data frame structure. A data spreader 304 spreads the data 302. The data spreader 304 uses a pseudorandom code of a particular length to spread the data 302. As noted above, the spreading code can be between 256 and 2,048 bits long. The spread data is then provided to a transmitter 308. Normally, the transmitter 308 would start to transmit the spread data at the start of a boundary, such as a frame boundary. As explained above, this can cause signals from different access points to interfere with one another. This is especially true, if the access points are synchronized in regard to when data transmissions start. While access points can be synchronized together, the data transmitted by the access points is not the same. Accordingly, interfering signals cannot be combined. A delay generator 306 provides the transmitter 308 with a delay. In various implementations, the delay generator is a random number generator. In these implementations, the delay generators use a seed value that is unique to the access point. The transmitter 308 delays the start of data transmission by the delay. In various implementations where the access point transmits frames, each frame is delayed by a delay provided by the delay generator 306. The transmitter 308, therefore, will delay transmission of a frame by the particular delay. This results in the starting the transmission of the frame the delayed amount from the frame boundary. When all access points in a system use this delayed transmission technique, the interference between signals is reduced.

Modules that receive data frames can sleep between data frames to reduce power consumption. Upon waking up, the modules must reacquire the signal to be able to properly receive data from access points. The timing that a module determines from previously data acquisitions is used to determine the start of the next frame boundary where the module should reacquire the system to receive data. The module, however, has to take into account the delayed start of transmission to properly receive the transmitted data frame. In addition, as each data frame includes a new transmission delay the module must be able to handle the delay without knowing beforehand what is the delay. In various implementations, decoding can be achieved by the module attempting to decode the signal using multiple accumulators. Each accumulator starts with the received signal but delayed by some amount. There can be one accumulator for each possible delay value. For example, the possible transmission delay can be 5, 10, 15, etc. chips. The accumulator that has the strongest signal indicates what the transmission delay way. The module can treat the timing of the received signal as the start of the frame boundary. In this way, the module will transmit its data with the same transmission delay used by the access point. The module, however, does not need to provide the transmission delay to the access point as the access point is already expecting to receive the data frame at the delayed time.

In various implementations, an access point transmits uses a half duplex data transmission/reception mode. As explained above, transmission of a data frame is delayed by some amount from a frame transmission boundary. The access point expects to receive a data response from a module, such as a receiver 310 shown in FIG. 3, at a frame reception boundary. The frame reception boundary is also delayed by the same amount as the previous data frame transmission. The access point, therefore, determines the frame reception boundary and adds the delay to the previously data frame transmission. In this way, the access point correctly determines when the data frame is expected to be received.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A communication system comprising:
    a first access point comprising:
        a first spreader configured to spread a first frame of data using a first spreading code to create a spread first frame and to spread a second frame of data using the first spreading code to create a spread second frame;
        a delay generator configured to generate a first transmission delay and a second transmission delay;
        a transmitter configured to start to transmit the first spread frame on a first frame boundary delayed by the first transmission delay and to start to transmit the second spread frame on a second frame boundary delayed by the second transmission delay; and
        a receiver configured to start reception of a third spread frame on a third frame boundary delayed by the first transmission delay and to start reception of a fourth spread frame on a fourth frame boundary delayed by the second transmission delay.

2. The communication system of claim 1, further comprising:
    a second access point comprising:
        a second spreader configured to spread a third frame of data using a second spreading code to create a spread third frame and to spread a fourth frame of data using the second spreading code to create a spread fourth frame;
        a second delay generator configured to generate a third transmission delay and a fourth transmission delay; and
        a second transmitter configured to start to transmit the third spread frame on the first frame boundary delayed by the third transmission delay and to start to transmit the fourth spread frame on the second frame boundary delayed by the fourth transmission delay.

3. The communication system of claim 1, wherein the spreading code has a length of 256 bits.

4. The communication system of claim 1, wherein the the spreading code has a length of 2048 bits.

5. The communication system of claim 2, wherein the first access point is frame boundary synchronized with the second access point.

6. The communication system of claim 1, wherein the first spread frame is transmitted on a broadcast channel.

7. The communication system of claim 1, wherein the delay generator is a random number generator.

8. An access point comprising:
    a spreader configured to spread a first frame of data using a spreading code to create a spread first frame and to spread a second frame of data using the spreading code to create a spread second frame;
    a delay generator configured to generate a first transmission delay and a second transmission delay;
    a transmitter configured to start to transmit the first spread frame on a first frame boundary delayed by the first transmission delay and to start to transmit the second spread frame on a second frame boundary delayed by the second transmission delay; and
    a receiver configured to start reception of a third spread frame on a third frame boundary delayed by the first transmission delay and to start reception of a fourth spread frame on a fourth frame boundary delayed by the second transmission delay.

9. The access point of claim 8, wherein the spreading code has a length of 256 bits.

10. The access point of claim 8, wherein the spreading code has a length of 2048 bits.

11. The access point of claim 8, wherein the first access point is frame boundary synchronized with a second access point.

12. The access point of claim 8, wherein the first spread frame is transmitted on a broadcast channel.

13. The access point of claim 8, wherein the delay generator is a random number generator.

14. An method comprising:
    spreading, using a spreader, a first frame of data using a spreading code to create a spread first frame and to spread a second frame of data using the spreading code to create a spread second frame;

determining, using a delay generator, a first transmission delay and a second transmission delay;

starting to transmit, using a transmitter, the first spread frame on a first frame boundary delayed by the first transmission delay;

starting to transmit the second spread frame on a second frame boundary delayed by the second transmission delay;

starting to receive a third spread frame on a third frame boundary delayed by the first transmission delay; and starting to receive a fourth spread frame on a fourth frame boundary delayed by the second transmission delay.

15. The method of claim 14, wherein the spreading code has a length of 256 bits.

16. The method of claim 14, wherein the spreading code has a length of 2048 bits.

17. The method of claim 14, wherein the access point is frame boundary synchronized with a second access point.

18. The method of claim 14, wherein the first spread frame is transmitted on a broadcast channel.

19. The method of claim 14, wherein the delay generator is a random number generator.

* * * * *